United States Patent
Bozbey et al.

(10) Patent No.: US 12,443,836 B2
(45) Date of Patent: Oct. 14, 2025

(54) THRESHOLD ADJUSTABLE SUPERCONDUCTING LOGIC GATE WITH NEURAL CIRCUIT

(71) Applicant: TOBB EKONOMI VE TEKNOLOJI UNIVERSITESI, Ankara (TR)

(72) Inventors: Ali Bozbey, Ankara (TR); Altay Karamuftuoglu, Ankara (TR)

(*) Notice: Subject to any disclaimer, the term of this patent is extended or adjusted under 35 U.S.C. 154(b) by 947 days.

(21) Appl. No.: 17/626,927

(22) PCT Filed: Jul. 8, 2020

(86) PCT No.: PCT/TR2020/050601
§ 371 (c)(1),
(2) Date: Jan. 13, 2022

(87) PCT Pub. No.: WO2021/015697
PCT Pub. Date: Jan. 28, 2021

(65) Prior Publication Data
US 2022/0358353 A1    Nov. 10, 2022

(30) Foreign Application Priority Data

Jul. 22, 2019  (TR) .................... 2019/10971

(51) Int. Cl.
*G06N 3/063* (2023.01)
*H03K 19/195* (2006.01)

(52) U.S. Cl.
CPC ........... *G06N 3/063* (2013.01); *H03K 19/195* (2013.01)

(58) Field of Classification Search
None
See application file for complete search history.

(56) References Cited

U.S. PATENT DOCUMENTS

| 5,706,403 A | 1/1998 | Shibata |
| 9,853,645 B1 * | 12/2017 | Mukhanov ............ H10N 69/00 |
| 2013/0313623 A1 | 11/2013 | Vrudhula et al. |

FOREIGN PATENT DOCUMENTS

| CN | 106228239 A | 12/2016 |
| CN | 106250982 A | 12/2016 |
| GB | 1384020 A | 2/1974 |
| GB | 1359508 A | 7/1974 |

OTHER PUBLICATIONS

Neutzling et al., Effective Logic Synthesis for Threshold Logic Circuit Design, IEEE Transactions on Computer-Aided Design of Integrated Circuits and Systems, vol. 38, No. 5, May 2019; pp. 926-937 (Year: 2019).*
Sone et al., Resistor coupled Josephson logic, Appl. Phys. Lett. 40; Apr. 15, 1982; pp. 741-744 (Year: 1982).*
International Search Report for corresponding PCT/TR2020/050601 dated Oct. 16, 2020.
Written Opinion of the International Searching Authority for corresponding PCT/TR2020/050601 dated Oct. 16, 2020.

* cited by examiner

*Primary Examiner* — Alan Chen
(74) *Attorney, Agent, or Firm* — Egbert, McDaniel & Swartz, PLLC

(57) ABSTRACT

A logic gate with a neuron circuit which is used in electronic logic circuits, enables the arithmetic inputs to give output signal over the threshold value depending on a set threshold value according to the used AND, OR and MAJORITY logic gates, and enables to realize the logic processes by adjusting the triggering threshold value.

25 Claims, 2 Drawing Sheets

THRESHOLD ADJUSTABLE SUPERCONDUCTING LOGIC GATE WITH NEURAL CIRCUIT

TECHNICAL FIELD

Figure 1:
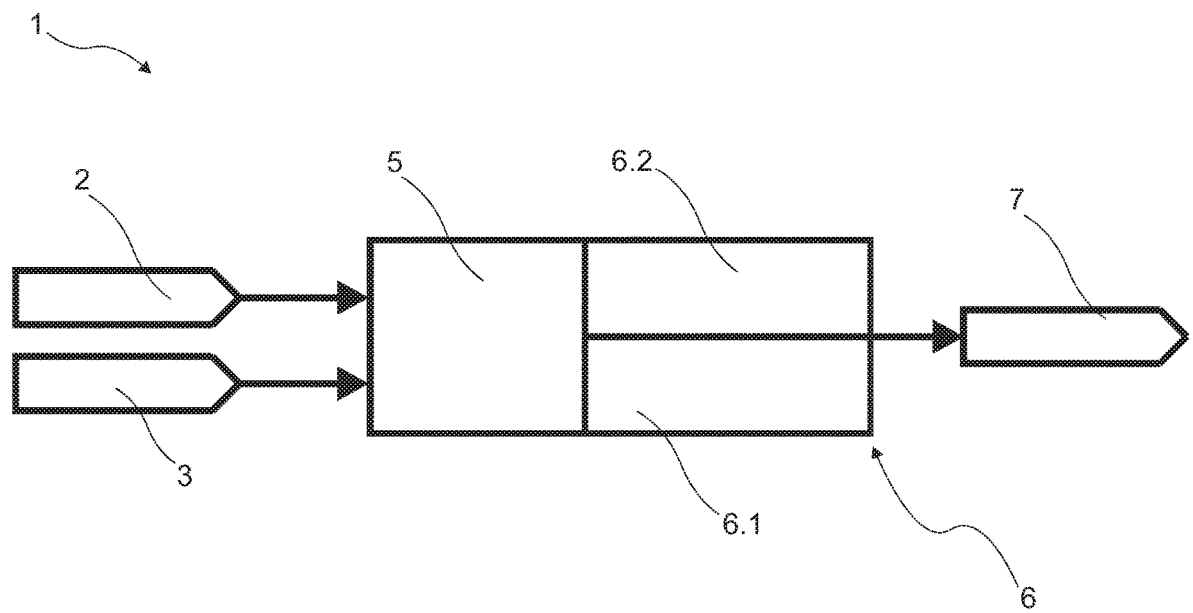

The present invention relates to a logic gate with neuron circuit, which electronically applies the working principle of the neurons in human brain, compares collected input signals to a preferred threshold value, and enables to provide an output signal if the collected signal is above the threshold value.

PRIOR ART

Artificial Intelligence (AI) is the general name given to the modelling work of the systems that exhibit similar behaviours by getting inspired by the behavioural patterns of all of the living creatures in nature. AI is usually directed at analysing humans' thinking methods and developing artificial instructions similar to them. In general, AI implement the behaviours identified as intelligent when conducted by humans (intelligent behaviour) to be performed by machines. In other words, AI is a theory showing how the human mind works. It is aimed to make the machines more intelligent and useful by means of AI. AI enables the machines with a number of functions like thinking, decision making, comparison and analysis such as the ones displayed by humans. AI has many applications such as expert systems, fuzzy logic, artificial neural networks, and genetic algorithms. Artificial Neural Networks (ANN) are logical software developed to perform, by mimicking the operation mechanism of the human brain, the basic functions of the brain such as learning, remembering and deriving new information by generalization. ANNs are synthetic structures that mimic the biological neural networks. The mimicked nerve cells contain neurons and these neurons connect to each other in various ways to form a network. These networks are capable of learning, storing in memory and revealing the relationship between data. ANNs are inspired by biological neurons (nerve cells), resulting in artificial simulation of the brain's working system. In general, ANNs, such as the binding of many biological neurons in the human brain, are produced for realizing a whole process structure at various levels of activity of many simple and generally adaptive processing units (artificial neurons) which mimic the input, processing, and output characteristics of the biological neuron.

In the current art, artificial neural networks can be evaluated in 3 main categories. The first one is software, the second is semiconductor device based and the last one is superconductor device based. Significant progress has been made in software and semiconductor based ANNs of the first and second categories, particularly in the stages of developing algorithms. However, the most important problem of these systems is their slow operation and high-power consumption. Neuron circuits can be designed in terms of software, but the processes are carried out slowly because too many algorithms are running. The problems with superconductor-based artificial nerve cells are that the circuits do not operate reliably, Single Flux Quantum (SFQ) is not compatible with the digital circuits, and that they are relatively complex structures having large areas. In the electronic application of ANNs, there are integrated structures on the chip and these structures occupy a large area. Currently, ANN application is performed electronically with semiconductors. When it is carried out with semiconductors, the size of the neuron circuits is large and in this case they are unpractical. On the other hand, the neuron circuits produced by the semiconductors consume too much power. Since the neuron circuits consume too much power, the current transmission also slows down. For this reason, the neuron circuits produced by semiconductors work slowly. In this case, the semiconducting neuron circuits cannot keep up with the brain in terms of the processing power. On the other hand, it is not possible in the state of the art to integrate the neuron circuits to each other and to work with the circuits that enable to produce the input. Furthermore, the neuron circuits provided in the current art cannot operate compatibly with the other logic gates (AND/OR, etc.) and are unable to receive and process the signal generated by the standard gates. While the neuron circuits are formed, there is a need for a low-power structure that conducts faster than semiconductors.

The logic gates form the basis of digital electronics. Digital circuits are obtained by using logic gates. The gates are included in the semiconductor elements which are called Integrated Circuit (IC), it is also possible to create logic gates by using resistance, diode and transistor. ICs are preferred due to their many superior properties for example low power consumption, high operation speed, small size, and economic cost. The basic circuit elements which are used in the digital circuits are named as logic gates. A logic gate has an output in addition to one or more input ports. Its output can be logic-1 or logic-0 depending on the state of the input values. The table which shows the output of a logic gate depending on the signal applied to the inputs of the same is called truth table. BUFFER, AND, OR, MAJORITY, NOT, NAND, NOR, XOR and XNOR are the main logic gates. In the digital circuits, generally AND, OR and MAJORITY logic gates are used. The "AND" process outputs "1" in case all logic inputs that enter to a gate are "1". The "OR" process outputs "1" in case any logic input that enters a gate is "1". The "MAJORITY" process outputs according to the logical majority with the voting method of the inputs coming from the input lines entering a gate.

In the current methods, "AND" and "OR" gates are the gates used in superconducting integrated circuits routinely. The most important disadvantage of the current gates is their requirement to the synchronization signals. The gate named as the "MAJORITY" gates were previously realized with various superconducting logic gates. One of this design's problems is that the time delays can be high depending on the synchronous working obligation (clock pulse input) and multi-layered structure.

In the circuits where the logic gates (AND/OR etc.) are found in the current state of the art, there is a plurality of junction system for each logic gate. The connections of the logic gates are provided by means of said junction systems. Therefore, many junction connections are used for an output signal to be received. The dimensions of the integrated circuits are extended by using said junction connections in combining the logic gates. The area to be used also increases with the extension of the dimensions of the integrated circuits. In case the integrated circuits extend with the use of the logic gates, said logic gates cannot be used in all areas. On the other hand, the power consumption and heat dissipation increase in the circuit because many junctions are used during the use of the logic circuits in the integrated circuits. In the current methods, while the logic gates are used, there must be a clock system (synchronous operation). The signals are prevented from coming successively due to the clock system included in the logic gates.

In this case, there is a requirement for the elements in the circuits where the logic circuits will be used, which will not occupy much space, will not consume too much power and heat, will provide the signals to come to the circuit successively without requiring synchronous operation system, will fulfil the logic gate function.

In the British patent document numbered GB1384020 (A) having priority date 12 Jul. 1971, a circuit design with adjustable threshold value is described. In the study included in said document, the transistor which passes to conductivity according to voltage supplied to the capacitor operates and thus determines the threshold value. When the input voltage remains low compared to the reference voltages, the value is increased and it is provided to reach the reference. This circuit type can be applied to the majority circuit. In the present invention the logic circuits which perform the AND, OR and MAJORITY processes are disclosed. In said logic circuits, adjustable threshold value is applied with two loop lines. Simultaneously, together with the resistance elements in the circuit, different threshold and period adjustment can be made for each process. In the present invention, the current is enabled to be lost by means of the heat when the adjusted period and the input are not sufficient. At the same time, adjustment of the number of inputs is provided in the neuron circuit logic. In the invention included in the state of the art, while adjustment is made with the voltage accumulation method in the capacitors, the usage of material properties differs from the patent of the present invention.

In the British patent document numbered GB1359508 (A) having priority date 10 Jun. 1970, a time signal counter is described. In the study included in said document, there is no predetermined fixed threshold value and the signals that exceed this value are included in the system. A comparator is used for determining the transitions between the clock pulses and when the obtained number reaches to forty then it is allowed to pass to the other line.

In the invention included in said document, threshold value is used and the AND gates are used to receive the passage information. In the present invention the logic circuits which perform the AND, OR and MAJORITY processes are disclosed. In said logic circuits, adjustable threshold value is applied with two loop lines. Simultaneously, together with the resistance elements in the circuit, different threshold and period adjustment can be made for each process. In the present invention, the current is enabled to be lost by means of the heat when the adjusted period and the input are not sufficient. At the same time, adjustment of the number of inputs is provided in the neuron circuit logic. In the invention included in the state of the art, while adjustment is made with the voltage accumulation method in the capacitors, the usage of material properties differs from the patent of the present invention.

In the United States document numbered US2013313623 (A1) having priority date 28 May 2013, a threshold gate adjustment system is described. In the application included in said document, modification can be made in the threshold values with two magnetic elements and two different magnetic features included in the threshold gate. Improvement is made in the circuit areas and speed together with this change obtained by modifying the resistance values. In the invention included in said document, it is possible to adjust the threshold value together with the resistance change. In the present invention the logic circuits which perform the AND, OR and MAJORITY processes are disclosed. In said logic circuits, adjustable threshold value is applied with two loop lines. Simultaneously, together with the resistance elements in the circuit, different threshold and period adjustment can be made for each process. In the present invention, the current is enabled to be lost by means of the heat when the adjusted period and the input are not sufficient. At the same time, the adjustment of the number of inputs is provided in the neuron circuit logic. In the invention included in the state of the art, while the adjustment is made with the voltage accumulation method in the capacitors, the usage of material properties and clock pulse differs from the patent of the present invention.

In the invention subject to application, a logic gate with neuron circuit which is used in electronic logic circuits, enables the arithmetic inputs to give output signal over the threshold value depending on a set threshold value according to the used AND, OR and MAJORITY logic gates, enables to realize the logic processes by adjusting the triggering threshold value, is disclosed. In case the logic gates with neuron circuit used in the invention subject to application are used, the operation of the input signals entering the logic gates in a way such that they exceed the threshold value is provided. In this case, the operation of the neuron circuits depending on the operation logic of the AND, OR and MAJORITY logic gates are provided with the invention subject to the application.

In the state of the art, there is no explanation regarding the technical features and the technical effects provided by the invention of the present application. In the current applications, the use of a logic gate with neuron circuit which is used in electronic logic circuits, enables the arithmetic inputs to give output signal over the threshold value depending on a set threshold value according to the used AND, OR and MAJORITY logic gates, enables to realize the logic processes by adjusting the triggering threshold value is not known.

AIMS OF THE INVENTION

The aim of this invention is to realize a logic gate with neuron circuit which reduces the extended circuit area by a plurality of junction connections of the logic gates used in the other logic circuits.

Another aim of the invention is to realize a logic gate with neuron circuit which minimizes the consumption of power and heat dissipation since the junctions in the logic gates are not required to be used.

Another aim of the invention is to realize a logic gate with neuron circuit which eliminates the requirement for the signals to arrive simultaneously before they enter the logic gates.

Another aim of the invention is to realize a logic gate with neuron circuit which operates such that it waits for the incoming signals to exceed the threshold value before entering the logic circuit.

BRIEF DESCRIPTION OF THE INVENTION

As defined in the first claim and the other dependant claims, in order to achieve the aim of this invention, the logic gate with the neuron circuit consists of the first arithmetic input, the second arithmetic input, the third arithmetic input, the merger, the neuron circuit and the arithmetic output. The first arithmetic input, the second arithmetic input, the third arithmetic input is connected to the merger. The merger converts the parallel signals coming from the first arithmetic input, the second arithmetic input, the third arithmetic input into serial signals. The logic gate with neuron circuit can be used to replace AND, OR and MAJORITY logic gates. The first arithmetic input, the second arithmetic input, the third arithmetic input connected to the merger circuit and the circuit is connected to the input signal of the neuron circuit. The first arithmetic input and the second arithmetic input are used when it is required to use the neuron circuit with logic gate characteristics to define AND and OR logic gates with similar operating properties. The first arithmetic input, the second arithmetic input and the third arithmetic input are used when it is required to use the neuron circuit with logic gate characteristics to define MAJORITY logic gate with similar operating properties. The parallel signals are converted into serial signals and they enter the neuron circuit since all the arithmetic inputs are combined at the merger circuit. A threshold signal value is determined according to the preferred logic gate during usage of the neuron circuit with preferred characteristics. Said threshold value is tuneable and it changes for AND, OR and MAJORITY logic operations. When it is preferred to operate the neuron circuit as the AND logic gate, in case two of the digital signals entering from the first arithmetic input and the second arithmetic input with a value of "1", the digital signal value of "1" will be assigned to the output of neuron circuit. For the other cases, the output value will be "0". When it is preferred to operate the logic gate with neuron circuit as the OR logic gate, in case one of the digital signals entering from the first arithmetic input and the second arithmetic input with a value of "1", the digital signal value of "1" will be assigned to output of neuron circuit. The other cases will give "0" as an output result on the neuron circuit. When it is preferred to operate the logic gate with neuron circuit as the MAJORITY logic gate, in case two of the digital signals entering from the first arithmetic input, the second arithmetic input and the third arithmetic input with a value of "1", the digital signal value of "1" will be observed at the neuron circuit output. Thus, the triggering threshold value is adjusted with the help of the neuron circuit depending on the threshold values of the AND, OR and MAJORITY logic gates used with the logic gate with neuron circuit and therefore, the consumption of power and heat dissipation can be minimized by reducing the circuit area in the integrated circuits.

DETAILED DESCRIPTION OF THE INVENTION

The logic gate with neuron circuit developed to fulfil the objects of the present invention is illustrated in the accompanying figures, in which:

FIG. 1. is a schematic view of the logic gate with neuron circuit which is used as AND and OR logic gate.

Figure 2:
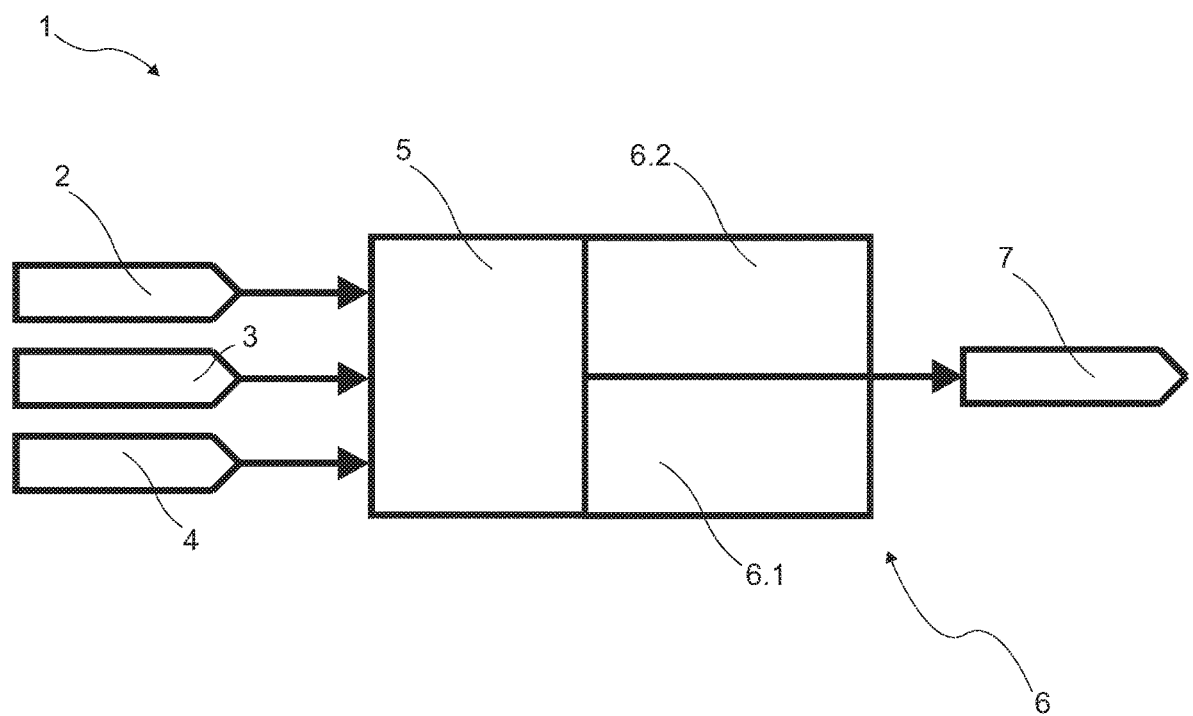

FIG. 2. is a schematic view of the logic gate with neuron circuit which is used as MAJORITY logic gate.

Figure 3:
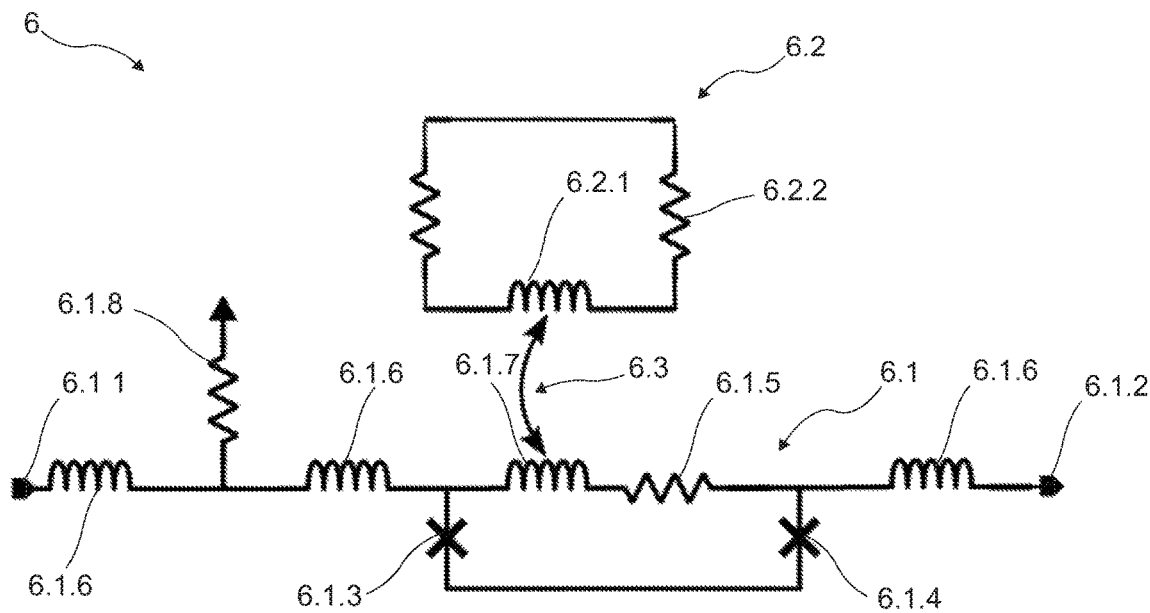

FIG. 3. is a schematic view of the neuron circuit.

Figure 4:
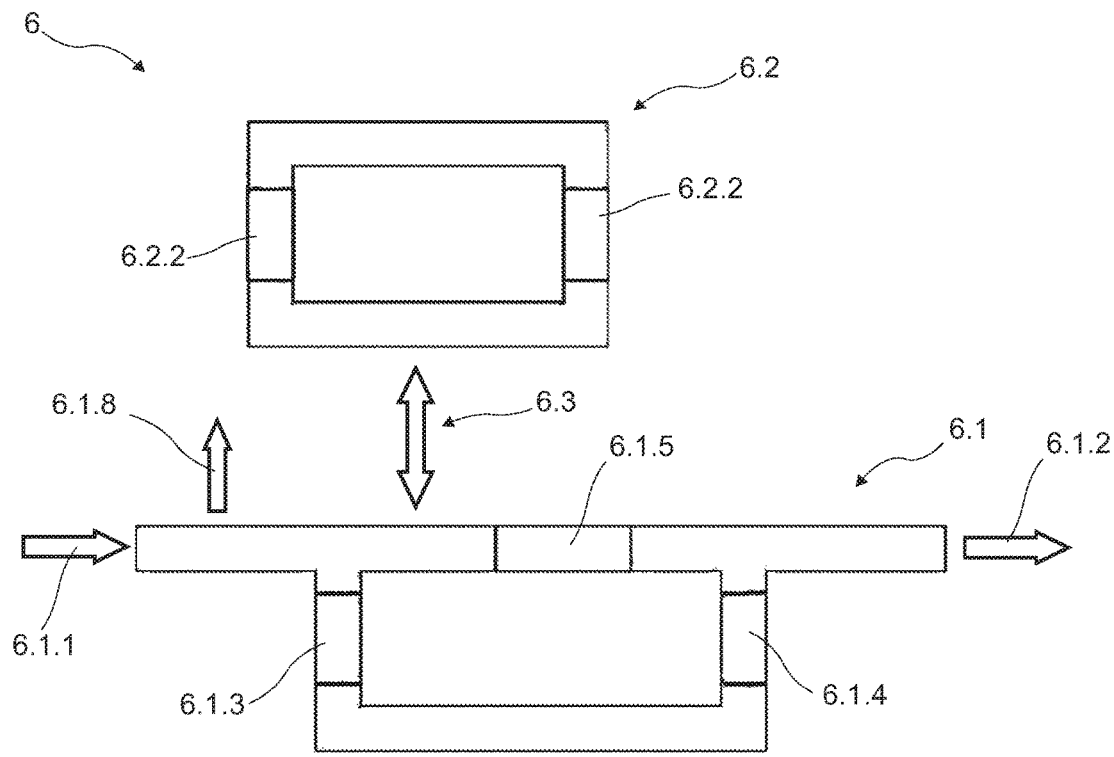

FIG. 4. is a diagram view of the neuron circuit.

The parts in the figure are enumerated one by one and the parts correspond to these numbers are given in the following:

1. Logic gate with neuron circuit
2. First arithmetic input
3. Second arithmetic input
4. Third arithmetic input
5. Merger
6. Neuron circuit
    6.1. Threshold loop
        6.1.1. Input signal
        6.1.2. Output signal
        6.1.3. First junction
        6.1.4. Second junction
        6.1.5. Threshold resistance
        6.1.6. Threshold side inductor
        6.1.7. Threshold side coupled inductor
        6.1.8. Bias input
    6.2. Decaying loop
        6.2.1. Decaying side coupled inductor
        6.2.2. Decaying resistance
    6.3. Decaying threshold coupling
7. Arithmetic output The logic gate with neuron circuit (1) which is used in electronic logic circuits, enables the arithmetic inputs to give output signal over the threshold value depending on a set threshold value according to the preferred AND, OR and MAJORITY logic gates, enables to realize the logic processes by adjusting the triggering threshold value, mainly comprises the following, at least first arithmetic input (2) as one of the input digital signals of the logic gate, at least second arithmetic input (3) as another one of the input digital signals of the logic gate, at least one merger (5) which combines and converts the signals coming from the first arithmetic input (2) and the second arithmetic input (3) in a parallel manner into a serial signal, at least one threshold loop (6.1) which comprises at least one input signal (6.1.1), at least one output signal (6.1.2), at least one first junction (6.1.3), at least one second junction (6.1.4) and at least one threshold side coupled inductor (6.1.7), has a superconductor structure, receives the signal coming from the merger through the input signal (6.1.1), absorbs said signal according to the threshold value or provides the output of the signal through the output signal (6.1.2), repeats the same process for each new signal, at least one first junction (6.1.3), and at least one second junction (6.1.4) which enable the signal to remain within the threshold loop (6.1) between the input signal (6.1.1) and the output signal (6.1.2) until it reaches the threshold value and have an insulating structure, at least one decaying loop (6.2) which comprises at least one decaying side coupled inductor (6.2.1), has a superconductor structure, provides determining the threshold value of the signal in the threshold loop (6.1) by means of integrating the same to the threshold loop (6.1), neuron circuit (6) which connects to the threshold side coupled inductor (6.1.7) on the threshold loop (6.1) with the decaying threshold coupling (6.3), enables to determine the threshold value of the signal in the threshold loop (6.1) with the coupling factor between the threshold side coupled inductor (6.1.7) with the effect of the created magnetic areas according to AND, OR and MAJORITY logic gates, comprises at least one decaying side coupled inductor (6.2.1), at least one arithmetic output (7) which is connected to the output signal (6.1.2) and is used for transmitting said signal.

The inventive logic gate with neuron circuit (1) can be used in the electronic logic circuits. The logic gate with neuron circuit (1) enables the arithmetic inputs to give output signal over a set threshold value depending on a set threshold value according to used AND, OR and MAJORITY logic gates. The logic gate with neuron circuit (1) enables to perform the logic operation by adjusting the triggering threshold value.

The process carried out with the "AND" logic gate used in the digital circuit gives output "1" in case all logic inputs entering the gate are "1". The "OR" process used in the digital circuits gives output "1" in case any logic inputs entering the gate are "1". The "MAJORITY" process used in the digital circuits provides output with the voting method according to the logical majority of the inputs coming from the input lines entering to a gate. In order to perform the processes that are carried out by said AND, OR and MAJORITY logic gates, logic gate with neuron circuit (1) is used. The logic gate with neuron circuit (1) comprises the first arithmetic input (2), the second arithmetic input (3), the third arithmetic input (4), the merger (5), the neuron circuit (6) and the arithmetic output (7). The logic gate with neuron circuit (1) used as the AND, OR and MAJORITY gate has a single input entry for the arithmetic input signals and it controls the said threshold values. The logic gate with neuron circuit (1) can be used in the superconducting integrated circuits without the need for a synchronous working.

In case the logic gates used in the invention subject to an application are performed with neuron circuit (6), the sum of the input signals entering the logic gates will be collected and the collected signals are required to exceed the threshold value. In this case, the operation of the neuron circuits (6) depending on the operation logic of the AND, OR and MAJORITY logic gates are provided with the inventive logic gate with neuron circuit (1).

The first arithmetic input (2) included in one embodiment of the invention is used as one of the input digital signals of the logic gate. The first arithmetic input (2) is connected to the merger (5). The first arithmetic input (2) provides the digital signals to the merger (5) and the neuron circuit (6). The first arithmetic input (2) is used for the transmission of the digital signal depending on the operation logic of the AND, OR and MAJORITY logic gates.

The second arithmetic input (3) included in one embodiment of the invention is used as one of the input digital signals of the logic gate. The first arithmetic input (3) is connected to the merger (5) together with the second arithmetic input (2) in a parallel manner. The second arithmetic input (3) provides the digital signals to the merger (5) and the neuron circuit (6). The second arithmetic input (3) is used for the transmission of the digital signal depending on the operation logic of the AND, OR and MAJORITY logic gates.

The third arithmetic input (4) included in one embodiment of the invention is used as one of the input digital signals of the logic gate. The third arithmetic input (4) is connected to the merger (5) together with the first arithmetic input (2) and the second arithmetic input (3) in a parallel manner. The third arithmetic input (4) provides the digital signals to the merger (5) and the neuron circuit (6). The third arithmetic input (4) is used for the transmission of the digital signal depending on the operation logic of the AND, OR and MAJORITY logic gates.

The merger (5) included in one embodiment of the invention combines and converts the signals coming from the first arithmetic input (2) and the second arithmetic input (3) in a parallel manner into a serial signal. The merger (5) is connected to the neuron circuit (6) with the first arithmetic input (2) and the second arithmetic input (3) and the third arithmetic input (4). The merger (5) converts the parallel signals coming from the first arithmetic input (2), the second arithmetic input (3) and the third arithmetic input (4) into serial signals and transmits the same to the neuron circuit (6).

The neuron circuit (6) included in one embodiment of the invention subject to application can generate the operating principle of the brain electronically and simulate the work of the neural network structure. The neuron circuit (6) is used in adjusting the required threshold values of the signals coming from the first arithmetic input (2), the second arithmetic input (3) and the third arithmetic input (4) and generating output signal if the collected signals are above the threshold value during the applications of AND, OR and MAJORITY logic gates. The neuron circuit (6) consists of the threshold loop (6.1) with superconductor structure and the decaying loop (6.2). The threshold loop (6.1) and the decaying loop (6.2) are matched to each other magnetically. The magnetic connection between the threshold loop (6.1) and the decaying loop (6.2) is provided by means of the decaying threshold coupling (6.3). The signal that enters the neuron circuit (6) is processed or decayed by the threshold loop (6.1). The threshold value of the signal processed in the threshold loop (6.1) can be adjusted and can be decayed by the decaying loop (6.2). The neuron circuit (6) compares collected input signals a set threshold value by simulating the nerve structure in the brain and provides an output signal if the collected input signals are above the threshold value. The neuron circuit (6) can be operated in an integrated manner with the other neuron circuits (6). Moreover, the neuron circuit (6) operates in harmony with the standard logic gates (AND, OR, MAJORITY). The circuit receives input signal from the standard logic gates and provides output signal to the standard logic gate. The neuron circuit (6) can be operated like the logic gates.

The threshold loop (6.1) in the neuron circuit (6) included in one embodiment of the invention provides to store and to decay features after receiving an input signal. The signals on the threshold loop (6.1) work like the ions in the brain. The threshold loop (6.1) comprises input signal (6.1.1), output signal (6.1.2), first junction (6.1.3), second junction (6.1.4), threshold resistance (6.1.5), threshold side inductor (6.1.6), threshold side coupled inductor (6.1.7) and bias input (6.1.8). The threshold loop (6.1) has a superconductor structure. The threshold loop (6.1) receives the input signal to be processed from the input signal (6.1.1). The threshold loop (6.1) decays said signal according to the threshold value or provides output signal through the output signal (6.1.2). The threshold loop (6.1) repeats the same process for each new signal. The input signal to the threshold loop (6.1) is carried out over the input signal (6.1.1). The input signal (6.1.1) can be connected to the circuit element which provides the signal preferred to enter the threshold loop (6.1). The input signal (6.1.1) enables the signal to enter the threshold loop (6.1). The signal entering the threshold loop (6.1) through the input signal (6.1.1) is stored in the threshold loop (6.1) and is also decayed. When the input signal is preferred to be stored in the threshold loop (6.1), the output of the signal from the threshold loop (6.1) is provided with the output signal (6.1.2).

In one embodiment of the invention, the first junction (6.1.3) and the second junction (6.1.4) included in the threshold loop (6.1) have an insulating structure. The first junction (6.1.3), and the second junction (6.1.4) enables the signal to remain within the threshold loop (6.1) between the input signal (6.1.1) and the output signal (6.1.2) until it reaches the threshold value. The first junction (6.1.3) and the second junction (6.1.4) remain mutually and parallel to each other within the threshold loop (6.1) (FIG. 2). The first junction (6.1.3) and the second junction (6.1.4) are found between the input signal (6.1.1) and the output signal (6.1.2) within the threshold loop (6.1). The first junction (6.1.3) and the second junction (6.1.4) are found within the threshold loop (6.1) in a loop which forms a signal loop. There is a loop in the threshold loop (6.1) where the signal remains between the input signal (6.1.1) and the output signal (6.1.2). The first junction (6.1.3) and the second junction (6.1.4) are found within said loop.

The first junction (6.1.3) and the second junction (6.1.4) enable the signal entering the threshold loop (6.1) through the input signal (6.1.1) to convert into an output signal when it exceeds the threshold value, to determine the amplitude of the signal in the threshold loop (6.1) and the number of the signals coming to the threshold loop (6.1). When the signal entering the threshold loop (6.1) through the input signal (6.1.1) reaches to the first junction (6.1.3) and the second junction (6.1.4), if the signal exceeds the threshold value, then it converts into an output signal and sends through the output signal (6.1.2). In this embodiment of the invention, in case the threshold resistance (6.1.5) and the threshold side inductor (6.1.6) is absent on the threshold loop (6.1), the first junction (6.1.3) and the second junction (6.1.4) continues to process the signal as an infinite loop until it reaches the preferred threshold value. If the signal coming to the threshold loop (6.1) is less than the preferred threshold value, it enters into the loop in the threshold loop (6.1), passes through the first junction (6.1.3) and the second junction (6.1.4). If the signal coming to the threshold loop (6.1) is more than the preferred threshold value level, it exits from the threshold loop (6.1). The signal that comes to the threshold loop (6.1) starts to circulate (to advance in the loop). While the signal is circulating in the threshold loop (6.1), some of its energy is decayed by means of the first junction (6.1.3) and the second junction (6.1.4). While the same signal continues to circulate within the threshold loop (6.1), the successive signals continue to come through the input signal (6.1.1). In this manner, the signals are stored in the threshold loop (6.1). In case the signals exceed the preferred threshold value, the stored signal is released from the output signal (6.1.2) as an output signal. The number of the signals coming to the threshold loop (6.1) or the threshold value can be determined by means of the first junction (6.1.3) and the second junction (6.1.4). Moreover, the required number of signals for exceeding the threshold value can be adjusted with the first junction (6.1.3) and the second junction (6.1.4).

In one embodiment of the invention, the threshold resistance (6.1.5) in the threshold loop (6.1) provides the decay or reduction of the signal. The threshold resistance (6.1.5) creates a current limitation factor by showing a counter force to the incoming signals. In this case, the threshold resistance (6.1.5) enables to decay or reduce the signal energy by limiting the signal on the threshold loop (6.1). The threshold resistance (6.1.5) adjusts the decay or reduction amount of collected signal energy on the threshold loop (6.1) coming from the first arithmetic input signal (2), the second arithmetic input signal (3) and the third arithmetic input signal (4) depending on AND, OR and MAJORITY logic gates.

When it is preferred to completely decay the signal entering the threshold loop (6.1), the threshold resistance (6.1.5) is used. The threshold resistance (6.1.5) enables the signal in the threshold loop (6.1) to behave according to the preferred threshold value. The preferred threshold value of the threshold loop (6.1) is adjusted with the threshold resistance (6.1.5). The threshold value of the threshold loop (6.1) is adjusted by the threshold resistance (6.1.5) depending on its usage as AND, OR and MAJORITY logic gate. The threshold value is increased or reduced by increasing or decreasing the value of the threshold resistance (6.1.5).

The threshold value on the threshold loop (6.1) will provide output from the output signal (6.1.2) depending on the incoming collected signals. The threshold value of the signal coming to the threshold loop (6.1) is determined such that it depends on its usage as AND, OR and MAJORITY logic gate. In this case, when it is used as the "AND" logic gate, the threshold value of the signal coming to the threshold loop (6.1) is adjusted such that both of the signals coming through the first arithmetic input (2) and the second arithmetic input (3) are the same and signal value "1" to provide output signal value "1". In case it is used as the "OR" logic gate, the threshold value of the signal coming to the threshold loop (6.1) is adjusted such that it is provided to output "1" digital signal value if at least one of the signals coming from the first arithmetic input (2) or the second arithmetic input (3) has a digital signal value of "1". In case it is used as the "MAJORITY" logic gate, the threshold value of the signal coming to the threshold loop (6.1) is adjusted such that it is provided to output "1" digital signal value if at least two of the signals coming from the first arithmetic input (2), the second arithmetic input (3) or the third arithmetic input (4) have a digital signal value of "1".

The signal decaying must be carried out in order to adjust the threshold value of the threshold loop (6.1). At the same time, the threshold resistance (6.1.5) also provides the adjustment of the storage durations of the signal/signals to be stored in the threshold loop (6.1). When the input signal enters the threshold loop (6.1), it is stored in the threshold loop (6.1). The threshold resistance (6.1.5) preferably reduces the storage of the signal stored in the threshold loop (6.1). The threshold resistance (6.1.5) provides the signal in the threshold loop (6.1) to be stored such that it will be decayed in time. While the threshold loop (6.1.5) continues to store the signal by decaying the same, the first junction (6.1.3) and the second junction (6.1.4) enables the signal to remain in the threshold loop (6.1) until it reaches the threshold value.

In one embodiment of the invention, the threshold side inductor (6.1.6) in the threshold loop (6.1) provides signal transmission on the threshold loop (6.1) with superconductor structure. The adjustment of the storage duration of the signals entering from the first arithmetic input signal (2), the second arithmetic input signal (3) and the third arithmetic input signal (4) on the threshold loop (6.1) such as the threshold side inductor (6.1.6), threshold resistance (6.1.5) can be changed depending on their usage as the AND, OR and MAJORITY logic gate. The threshold inductance (6.1.6) operates to store current in it.

The threshold side inductor (6.1.6) also provides the adjustment of the storage durations of the signal/signals to be stored in the threshold loop (6.1) similar to the threshold resistance (6.1.5). While the signal transmission is continued with the threshold side inductor (6.1.6), the signal is continued to be stored by decaying the same with the threshold resistance (6.1.5). While the signal is continued to be stored in the threshold loop (6.1) by decaying the same until it reaches the threshold value, it is provided by the first junction (6.1.3) and the second junction (6.1.4). The threshold value is determined by means of the decaying loop (6.2). The threshold side inductor (6.1.6) provides the adjustment of the storage duration of the signals entering from the first arithmetic input signal (2), the second arithmetic input signal (3) and the third arithmetic input signal (4) within the threshold loop (6.1). The threshold side inductor (6.1.6) enables to adjust the storage duration in the threshold loop (6.1) according to the threshold value determined by the operation of the AND, OR and MAJORITY logic gate which are preferred to be applied.

In one embodiment of the invention, the threshold side inductor (6.1.7) in the threshold loop (6.1) provides the connection between the threshold loop (6.1) and the decaying loop (6.2). The threshold loop (6.1) and the decaying loop (6.2) are matched to each other magnetically. The matching of the threshold loop (6.1) and the decaying loop (6.2) each other magnetically is provided by means of the threshold side coupled inductor (6.1.7).

In one embodiment of the invention, the bias input (6.1.8) in the threshold loop (6.1) provides continuous feeding. The bias input (6.1.8) enables the required energy for the operation of the threshold loop (6.1). The bias input (6.1.8) feeds the threshold loop (6.1) with direct current (DC). The first junction (6.1.3) and the second junction (6.1.4) included in the threshold loop (6.1) operated with the direct current supply. In this case, the operation of the first junction (6.1.3) and the second junction (6.1.4) is provided by means of giving direct current to the threshold loop (6.1) while making the bias input (6.1.8) active. The bias input (6.1.8) also provides the required signal amount to remain at the threshold value. The bias input (6.1.8) operates under a current similar to preferably a transistor. In this embodiment of the invention, the bias input (6.1.8) provides the operation of the first and the second junctions by opening and closing the same that are included in the loop when the signal is received on the threshold loop (6.1).

The decaying loop (6.2) in the neuron circuit (6) included in one embodiment of the invention is matched to the threshold loop (6.1) magnetically. The decaying loop (6.2) adjusts the timing level of output signal entering the threshold loop (6.1). The decaying loop (6.2) enables to adjust the output duration and timing of the input signal depending on the coupling factor between the same and the threshold loop (6.1). The decaying loop (6.2) comprises decaying side coupled inductor (6.2.1) and decaying resistance (6.2.2). The decaying loop (6.2) has a superconductor structure. The decaying loop (6.2) provides the signal in the threshold loop (6.1) to determine the threshold value by means of being integrated to the threshold loop (6.1). After the signals entering the first arithmetic input (2), the second arithmetic input (3) and the third arithmetic input (4) entered through the input signal (6.1.1), they are stored in the threshold loop (6.1). The decaying loop (6.2) provides the determination of the threshold value of said signals that are stored in the threshold loop (6.1). The threshold value of the signals entering through the first arithmetic input signal (2), the second arithmetic input signal (3) and the third arithmetic input signal (4) depending on the operation of the AND, OR and MAJORITY logic gate preferred to be applied by means of using the decaying loop (6.2).

The decaying loop (6.2) provides the signal in the threshold loop (6.1) to decay or to adjust the threshold value of the same. The decaying loop (6.2) performs the decaying process of the signal in the threshold loop (6.1). There may be one or more decaying resistance (6.2.2) on the decaying loop (6.2). The decaying resistance (6.2.2) provides signal decaying. The decaying resistance (6.2.2) included in the decaying loop (6.2) provides the decaying process by decaying the signal in the threshold loop (6.1) to which it is magnetically matched. A current is formed on the decaying loop (6.2) depending on the magnetic field, together with the adjustment of the coupling factor between the decaying loop (6.2) and the threshold loop (6.1) at a sufficient level. The current formed on the decaying loop (6.2) is reduced as it is passing over the decaying resistance (6.2.2). When the current in the decaying loop (6.2) decreases, the magnetic field also decreases and the current converts into heat. The decaying resistance (6.2.2) included in the decaying loop (6.2) provides the adjustment of the threshold value of the signal in the threshold loop (6.1). When the decaying resistance (6.2.2) increases, the threshold value of the signal in the threshold loop (6.1) also increases. In this case where the decaying resistance (6.2.2) increases, the threshold value also increases and more signals are required.

Decaying side coupled inductor (6.2.1) in the decaying loop (6.2) in one embodiment of the invention is connected to the threshold side inductor (6.1.7) on the threshold loop (6.1) by means of the decaying threshold coupling (6.3). The threshold value for the signal in the threshold loop (6.1) is determined with the coupling factor between the threshold side coupled inductor (6.1.7) and the decaying side coupled inductor (6.2.1) while creating the magnetic field. Thus, in order to form the operation of AND, OR and MAJORITY logic gates, the threshold value of the signals coming from the first arithmetic input (2), the second arithmetic input (3) and the third arithmetic input (4) can be determined. The output of the preferred digital signal from the arithmetic output (7) with the determined threshold value depending on the operation of the AND, OR and MAJORITY logic gates.

In one embodiment of the invention, the decaying threshold coupling (6.3) included in the neuron circuit (6) provides the connection between the threshold loop (6.1) and the decaying loop (6.2). The threshold loop (6.1) and the decaying loop (6.2) are matched to each other magnetically. The magnetic connection between the threshold loop (6.1) and the decaying loop (6.2) is provided by means of the decaying threshold coupling (6.3). Threshold side coupled inductor (6.1.7) in the threshold loop (6.1) and the decaying side coupled inductor (6.2.1) on the decaying loop (6.2) are located such that they are not affected from their magnetic fields. In this case, when the threshold loop (6.1) is in the fixed position, the position of the decaying loop (6.2) can be adjusted such that the magnetic field created by the decaying side coupled inductor (6.2.1) is affected by the threshold side coupled inductor (6.1.7). The magnetic field created by the decaying side coupled inductor (6.2.1) and the magnetic field created by the threshold side coupled inductor (6.1.7) can trigger each other. The coupling factor between the decaying loop (6.2) and the threshold loop (6.1) can be changed depending on the magnetic field created by the decaying side coupled inductor (6.2.1) and the magnetic field created by the threshold side coupled inductor (6.1.7). The threshold value of the signal in the threshold loop (6.1) can be adjusted by changing the coupling factor between the decaying loop (6.2) and the threshold loop (6.1).

In one embodiment of the invention, when the coupling factor between the decaying loop (6.2) and the threshold loop (6.1) is reduced, the threshold of the signal in the threshold loop (6.1) is also reduced. When the coupling factor between the decaying loop (6.2) and the threshold loop (6.1) is increased, the decaying side coupled inductor (6.2.1) is affected maximally from the magnetic field of the threshold side coupled inductor (6.1.7). The decay of the signal current stored in the threshold loop (6.1) is accelerated together with the decaying side coupled inductor (6.2.1) being affected maximally from the magnetic field of the threshold side coupled inductor (6.1.7). The signal is output from the output signal (6.1.2) when the threshold value is reached by the signals newly coming during decaying process. In this case, during the simulation of AND, OR and MAJORITY logic gates, the signals entering through the first arithmetic inlet (2), the second arithmetic inlet (3) and the third arithmetic inlet (4) are stored in the threshold loop (6.1). The decaying of the signal current stored in the threshold loop (6.1) accelerates and it outputs from the output signal (6.1.2) when it reaches the threshold value determined according to the operation of the AND, OR and MAJORITY logic gates by the new coming signal/signals.

Thus the coupling factor between the decaying loop (6.2) and the threshold loop (6.1) enables to reduce the threshold value in a manner such that the signal in the threshold loop (6.1) exceeds the threshold value determined according to the operation of the AND, OR and MAJORITY logic gates.

In one embodiment of the invention, when the coupling factor between the decaying loop (6.2) and the threshold loop (6.1) is increased, the threshold of the signal in the threshold loop (6.1) is also increased. When the coupling factor between the decaying loop (6.2) and the threshold loop (6.1) is decreased, the decaying side coupled inductor (6.2.1) is affected from the magnetic field of the threshold side coupled inductor (6.1.7) at minimum level. The decaying of the signal stored in the threshold loop (6.1) slows down and it sends an output from the output signal (6.1.2) when it reaches to the threshold value by means of the new coming signal/signals as the decaying side coupled inductor (6.2.1) is minimally affected by the magnetic field of the threshold side coupled inductor (6.1.7). In this case, during the simulation of AND, OR and MAJORITY logic gates, the signals entering through the first arithmetic input (2), the second arithmetic input (3) and the third arithmetic input (4) are stored in the threshold loop (6.1). The decaying of the signal current stored in the threshold loop (6.1) slows down and it sends an output from the output signal (6.1.2) when it reaches the threshold value determined according to the operation of the AND, OR and MAJORITY logic gates by the new coming signal/signals. Thus when the coupling factor between the decaying loop (6.2) and the threshold loop (6.1) is increased, the threshold value can be increased in a manner such that the signal in the threshold loop (6.1) exceeds the threshold value determined according to the operation of the AND, OR and MAJORITY logic gates.

The usage of the neuron circuit (6) included in one embodiment of the invention is realized as the following. The threshold loop (6.1) and the decaying loop (6.2) included in the neuron circuit (6) have superconductor structure. The signal enters to the threshold loop (6.1) through the input signal (6.1.1). The threshold resistance (6.1.5) is used when the signal entering the threshold loop (6.1) is preferred to be decayed completely. The currents passing through the threshold resistance (6.1.5) are decayed. The first junction (6.1.3) and the second junction (6.1.4) are used when the signal entering to the threshold loop (6.1) is preferred to be stored. The signals coming from the input signal (6.1.1) at determined intervals are stored in the threshold loop (6.1) by means of the first junction (6.1.3) and the second junction (6.1.4). When the signal stored in the threshold loop (6.1) reaches to the threshold value, its output through the output signal (6.1.2) is realized. The time setting of the output signal is performed by the decaying loop (6.2). The decaying loop (6.2) and the threshold loop (6.1) are connected to each other in a magnetic interaction by means of the decaying threshold coupling (6.3). The timing and the threshold value adjustment of the output signal can be made by changing the coupling factor between the decaying loop (6.2) and the threshold loop (6.1).

The arithmetic output (7) included in one embodiment of the invention is connected to the output signal (6.1.2). The arithmetic output (7) can be used for transmitting said signal whose output is realized from the output signal (6.1.2). The arithmetic output (7) can be connected to the relevant system depending on the area where the logic gate with neuron circuit (1) will be used. The digital signal that is output from the output signal (6.12) of the neuron circuit (6) is output directly from the arithmetic output (7).

The usage of the logic gate (1) with neuron circuit included in one embodiment of the invention as the "AND" logic gate is realized as the following. The first arithmetic input (2) and the second arithmetic input (3) are connected to the merger (5). The merger (5) is connected to the input signal (6.1.1) of the neuron circuit (6). The neuron circuit (6), can be found between the merger (5) and the arithmetic output (7). The neuron circuit (6) is connected to the arithmetic output (7) from the output signal (6.1.2). When the logic gate with neuron circuit (1) is preferred to be used as the "AND" logic gate, the threshold value is preferably determined as the total number of the first arithmetic input (2) and the second arithmetic input (3) where the input signals are provided. In this case, when the digital signal value of "1" is observed on the first arithmetic input (2) and the second arithmetic input (3), the threshold value which is required for the "AND" logic gate is exceeded. The parallel "1" digital signals coming from the first arithmetic input (2) and the second arithmetic input (3) are converted to serial "1" digital signals in the merger (5). The digital signals of serial "1" that are sent from the merger (5) initially enter the neuron circuit (6) through the input signal (6.1.1) of the threshold loop (6.1). The digital "1" signals coming from the input signal (6.1.1) at determined intervals are stored in the threshold loop (6.1) by means of the first junction (6.1.3) and the second junction (6.1.4). When the two digital "1" signals stored in the threshold loop (6.1) reaches to the threshold value of the "AND" logic gate, the digital signal "1" through the output signal (6.1.2) is realized. The digital signal "1" that is coming from the output signal (6.12) is observed on the arithmetic output (7). Similarly, when the "AND" logic gate is preferred to be used as the logic gate and when at least one of the first arithmetic input (2) and the second arithmetic input (3) enters with digital signal value of "0", the output of digital signal value of "0" from the output signal (6.1.2) is observed since the threshold value cannot be reached in the neuron circuit (6).

The usage of the logic gate with neuron circuit (1) included in one embodiment of the invention as the "OR" logic gate is realized as the following. The first arithmetic input (2) and the second arithmetic input (3) are connected to the merger (5). The merger (5) is connected to the input signal (6.1.1) of the neuron circuit (6). The neuron circuit (6), can be found between the merger (5) and the arithmetic output (7). The neuron circuit (6) is connected to the arithmetic output (7) from the output signal (6.1.2).

When the logic gate with neuron circuit (1) is preferred to be used as the "OR" logic gate, the threshold value is preferably determined to be a number which is one decremented value from the total number of inputs that are the first arithmetic input (2) or the second arithmetic input (3) where the input signals are provided. In this case, when at least one digital signal value of "1" is observed on any of the first arithmetic input (2) and the second arithmetic input (3), the threshold value which is required for the "OR" logic gate is exceeded. The parallel "1" or "0" digital signals coming from the first arithmetic input (2) and the second arithmetic input (3) are converted into serial "1" or "0" digital signals in the merger (5). The digital signals of serial "1" or "0" that are sent from the merger (5), initially enter the neuron circuit (6) through the input signal (6.1.1) of the threshold loop (6.1). The digital signals of "1" or "0" coming from the input signal (6.1.1) at determined intervals are stored in the threshold loop (6.1) by means of the first junction (6.1.3) and the second junction (6.1.4). When the value of the digital signal "1" and "0" stored in the threshold loop (6.1) reaches the threshold value of the "OR" logic gate, the output of the digital signal "1" from the output signal (6.1.2) is realized. The digital signal "1" observed on the output signal (6.12) will be transmitted through the arithmetic output (7). When the "OR" logic gate is preferred to be used as the logic gate and when signals with digital signal value of "0" enter from the first arithmetic input (2) and the second arithmetic input (3), output of the digital signal value of "0" from the output signal (6.1.2) is observed since the threshold value cannot be reached in the neuron circuit (6).

The usage of the logic gate (1) with neuron circuit included in one embodiment of the invention as the "MAJORITY" logic gate is realized as the following. Each one of the first arithmetic input (2), the second arithmetic input (3) and the third arithmetic input (4) are used at least once in the "MAJORITY" logic gate. The first arithmetic input (2), the second arithmetic input (3) and the third arithmetic input (4) are connected to the merger (5). The merger (5) is connected to the input signal (6.1.1) of the neuron circuit (6). The neuron circuit (6), can be found between the merger (5) and the arithmetic output (7). The neuron circuit (6) is connected to the arithmetic output (7) from the output signal (6.1.2). When the logic gate with neuron circuit (1) is preferred to be used as the "MAJORITY" logic gate, the threshold value is determined depending on the majority of the signals coming from the first arithmetic input (2), the second arithmetic input (3) and the third arithmetic input (4) where the threshold input signals are provided. In this case, when the digital signal value of "1" is observed on any two of the first arithmetic input (2), the second arithmetic input (3) and the third arithmetic input (4), the threshold value which is required for the "MAJORITY" logic gate is exceeded. The parallel "1" or "0" digital signals coming from the first arithmetic input (2), the second arithmetic input (3), and the third arithmetic input (4) are converted into serial "1" or "0" digital signals in the merger (5). The digital signals of serial "1" or "0" that are coming from the merger (5) initially enter the neuron circuit (6) through the input signal (6.1.1) of the threshold loop (6.1). The digital signals of "1" or "0" coming from the input signal (6.1.1) at determined intervals are stored in the threshold loop (6.1) by means of the first junction (6.1.3) and the second junction (6.1.4). When the value of the digital signal "1" and "0" stored in the threshold loop (6.1) reaches the threshold value of the "MAJORITY" logic gate, the output of the digital signal "1" from the output signal (6.1.2) is realized. The digital signal "1" that is coming from the output signal (6.12) is obtained from the arithmetic output (7). When the "MAJORITY" logic gate is preferred to be used as the logic gate, if one signal with digital signal value of "0" enters from only one of the first arithmetic input (2), the second arithmetic input (3) and the third arithmetic input (4), output of the digital signal value of "0" from the output signal (6.1.2) is achieved since the threshold value cannot be reached in the neuron circuit (6).

The invention claimed is:

1. A logic gate with a neuron circuit which is used in electronic logic circuits, enables arithmetic inputs to give an output signal over a threshold value depending on a set threshold value according to used AND, OR and MAJORITY logic gates, enables to realize logic processes by adjusting a triggering threshold value, the logic gate with neuron circuit comprising:
   at least a first arithmetic input as one of the input digital signals of the logic gate,
   at least a second arithmetic input as another one of the input digital signals of the logic gate,
   at least one merger which combines and converts signals coming from the first arithmetic input and the second arithmetic input in a parallel manner into a serial signal,
   at least one threshold loop which comprises at least one input signal, at least one output signal, at least one first junction, at least one second junction and at least one threshold side coupled inductor, has a superconductor structure, receives the signal coming from the merger through the input signal, absorbs said signal according to the threshold value or provides the output of the signal through the output signal, repeats the same process for each new signal,
   at least one first junction, and at least one second junction which enable the signal to remain within the threshold loop between the input signal and the output signal until it reaches the threshold value and have an insulating structure,
   at least one decaying loop which comprises at least one decaying side coupled inductor, has a superconductor structure, provides determining the threshold value of the signal in the threshold loop by means of integrating the same to the threshold loop,
   a neuron circuit which connects to the threshold side coupled inductor on the threshold loop with the decaying threshold coupling, enables to determine the threshold value of the signal in the threshold loop with the coupling factor between the threshold side coupled inductor with the effect of the created magnetic areas according to AND, OR and MAJORITY logic gates, comprises at least one decaying side coupled inductor,
   at least one arithmetic output which is connected to the output signal and is used for transmitting said signal.

2. The logic gate with neuron circuit according to claim 1, wherein the first arithmetic input which provides the digital signals to reach the merger and the neuron circuit and is used for the transmission of the digital signal depending on the operation logic of the AND, OR and MAJORITY logic gates.

3. The logic gate with neuron circuit according to claim 1, wherein the second arithmetic input which provides the digital signals to reach the merger and the neuron circuit and is used for the transmission of the digital signal depending on the operation logic of the AND, OR and MAJORITY logic gates.

4. The logic gate with neuron circuit according to claim 1, wherein the third arithmetic input which is connected to the merger together with the first arithmetic input and the second arithmetic input in a parallel manner, provides the digital signals to reach the merger and the neuron circuit and is used for the transmission of the digital signal depending on the operation logic of the AND, OR and MAJORITY logic gates.

5. The logic gate with neuron circuit according to claim 1, wherein the merger which is connected between the neuron circuit and the arithmetic inputs, the first arithmetic input, the second arithmetic input and the third arithmetic input, converts the parallel signals coming from said arithmetic inputs into serial signals and transmits the same to the neuron circuit.

6. The logic gate with neuron circuit according to claim 1, wherein the neuron circuit which is used in adjusting the required threshold values of the signals coming from the first arithmetic input, the second arithmetic input and the third arithmetic input and generating output signal if the collected signals are above the threshold value during the applications of the AND, OR and MAJORITY logic gates.

7. The logic gate with neuron circuit according to claim 1, wherein the neuron circuit which is compatible with the standard logic gates (AND, OR, MAJORITY), receives input signal from the standard logic gates and provides output signal to the same circuits and operates as standard logic gates.

8. The logic gate with neuron circuit according to claim 1, wherein the threshold loop which comprises first junction, second junction threshold resistance, threshold side coupled inductor, and bias input, provides storing or decaying the coming signal, have signal on it that work like the ions in the brain.

9. The logic gate with neuron circuit according to claim 1, wherein the threshold loop which receives the input signals coming from the merger through the input signal, decays said signals according to the threshold value or enables the signals to be output through the output signal.

10. The logic gate with neuron circuit according to claim 1, wherein the first junction and the second junction which enable the signal entering the threshold loop through the input signal to be converted into an output signal, determine the amplitude of the signal in the threshold loop and the number of the signals coming to the threshold loop.

11. The logic gate with neuron circuit according to claim 1, wherein the first junction and the second junction which convert the signal to an output signal by outputting the signal from the output signal when the signals entering the threshold loop through the input signal exceed the threshold value determined according to the AND, OR and MAJORITY logic gates.

12. The logic gate with neuron circuit according to claim 1, wherein the first junction and the second junction which determine the number of the signals coming to the threshold loop or the threshold value depending on the operation of the AND, OR and MAJORITY logic gates.

13. The logic gate with neuron circuit according to claim 1, wherein the threshold resistance which enables to decay or reduce the signal energy by limiting said signals such that it adjusts the threshold value of the same depending on the usage of the signals entering through the first arithmetic input signal, the second arithmetic input signal and the third arithmetic input signal on the threshold loop as AND, OR and MAJORITY logic gate.

14. The logic gate with neuron circuit according to claim 1, wherein the threshold resistance which provides the threshold value to be increased or decreased depending on the usage of the AND, OR and MAJORITY logic gate by means of increasing or decreasing the value.

15. The logic gate with neuron circuit according to claim 1, wherein the threshold side inductor which adjusts the decaying duration and the storage duration of the signals entering through the first arithmetic input signal, the second arithmetic input signal and the third arithmetic input signal on the threshold loop like the threshold resistance depending on their usage as AND, OR and MAJORITY logic gates.

16. The logic gate with neuron circuit according to claim 1, wherein the threshold side inductor which can provide to adjust the storage duration in the threshold loop according to the threshold value determined by the operation of the AND, OR and MAJORITY logic gate which are preferred to be applied.

17. The logic gate with neuron circuit according to claim 1, wherein the decaying loop which provides to determine the threshold value of the signals entering through the first arithmetic input signal, the second arithmetic input signal and the third arithmetic input signal depending on the operation of the AND, OR and MAJORITY logic gate preferred to be applied.

18. The logic gate with neuron circuit according to claim 1, wherein the decaying loop which enables to reduce the threshold value in a manner such that the signal in the threshold loop exceeds the threshold value determined according to the operation of the AND, OR and MAJORITY logic gates with its coupling factor between the threshold loop.

19. The logic gate with neuron circuit according to claim 1, wherein the neuron circuit whose threshold value is determined as the total number of the first arithmetic input and the second arithmetic input where the input signals are provided when the "AND" is preferred to be used as the logic gate.

20. The logic gate with neuron circuit according to claim 1, wherein the neuron circuit when the digital signal value of "1" comes from the first arithmetic input and the second arithmetic input, which exceeds the required threshold value for the "AND" logic gate, creates the output of the digital signal "1" from the output signal right after the collected signals stored in the threshold loop reaches to the threshold value of the "AND" logic gate.

21. The logic gate with neuron circuit according to claim 1, wherein the neuron circuit whose threshold value is preferably determined to be number which is minus one from the first arithmetic input or the second arithmetic input where the input signals are provided, when "OR" is preferred to be used as the logic gate.

22. The logic gate with neuron circuit according to claim 1, wherein the neuron circuit, exceeds the required threshold value for the "OR" logic gate when the digital signal value of "1" comes from any of the first arithmetic input and the second arithmetic input, creates the output of the digital signal "1" from the output signal right after the stored signals reaches the threshold value in the threshold loop.

23. The logic gate with neuron circuit according to claim 1, wherein the neuron circuit which is determined depending on the majority of the signals outputting from the first arithmetic input, the second arithmetic input and the third arithmetic input where the threshold input signals are provided when it is preferred to be used as the "MAJORITY" logic gate.

24. The logic gate with neuron circuit according to claim 1, wherein the neuron circuit creates a digital signal value "1" from output signal when any two of the first arithmetic input, the second arithmetic input and the third arithmetic input arrive as the digital signal value of "1".

25. The logic gate with neuron circuit according to claim 1, wherein the neuron circuit which realizes the output of the digital "1" signal from the output signal when the value of the digital signal "1" and "0" stored in the threshold loop reaches to the threshold value of the "MAJORITY" logic gate.

* * * * *